United States Patent
Reial

(10) Patent No.: US 7,362,792 B2
(45) Date of Patent: Apr. 22, 2008

(54) METHOD OF AND APPARATUS FOR COMPUTATION OF UNBIASED POWER DELAY PROFILE

(75) Inventor: Andres Reial, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 780 days.

(21) Appl. No.: 10/755,760

(22) Filed: Jan. 12, 2004

(65) Prior Publication Data

US 2005/0152436 A1 Jul. 14, 2005

(51) Int. Cl.
*H04B 1/69* (2006.01)
(52) U.S. Cl. ...................................... 375/147
(58) Field of Classification Search ............... 375/147, 375/140, 130, 377, 346, 316, 227, 224; 370/241, 370/252
See application file for complete search history.

(56) References Cited

U.S. PATENT DOCUMENTS

| 6,286,036 | B1 * | 9/2001 | Rhoads ...................... 709/217 |
| 6,370,397 | B1 | 4/2002 | Popović et al. |
| 6,510,143 | B1 | 1/2003 | Bejjani et al. |
| 7,039,199 | B2 * | 5/2006 | Rui ............................. 381/92 |
| 2001/0033603 | A1 | 10/2001 | Olaker |
| 2002/0003791 | A1 | 1/2002 | Hayata |
| 2003/0086512 | A1 | 5/2003 | Rick et al. |
| 2004/0052304 | A1 | 3/2004 | Reial |

| 2004/0095957 | A1 | 5/2004 | Zhao et al. |

FOREIGN PATENT DOCUMENTS

| EP | 1041729 | 10/2000 |
| EP | 1065801 | 1/2001 |
| EP | 1 276 248 A1 | 1/2003 |
| WO | WO 00/69090 | 11/2000 |
| WO | WO 01/18985 A1 | 3/2001 |
| WO | WO 01/76088 A2 | 10/2001 |
| WO | WO 02/80423 | 10/2002 |

OTHER PUBLICATIONS

"A New Combined Architecture for CDMA Location Searchers and Rake Receivers"; by Nabil R. Yousef et al.; Adaptive and Nonlinear Systems Laboratory Electrical Engineering Department; University of California, Los Angeles, CA; Published in Proc. International Symposium on Circuits and Systems (ISCAS), Geneva, Switzerland, May 2000; 11 pages.
"Path Searchers for a WCDMA Rake Receiver"; by Kim-Chayan Gan; Motorola Intelligence Everywhere; pp. 1-17.
Rene Jativa E., Joseph Vidal, "First Arrival Detection for Positioning in Mobile Channels," Dept. of Signal Theory and Communications, Universitat Politecnica de Catalunya (UPC)PIMRC 2002, 0-7803-7589-0.
Bianco, et al., "A Reconfigurable, Power-Scalable Rake Receiver IP for W-CDMA," CERCOM-Politecnico di Tornino-Italy, date unknown.

* cited by examiner

*Primary Examiner*—Temesghen Ghebretinsae
(74) *Attorney, Agent, or Firm*—Michael Cameron

(57) ABSTRACT

A method of determining a noise-corrected power delay profile includes determining a power delay profile and calculating a noise-corrected power delay profile. The step of calculating the noise-corrected power delay profile includes using a biased noise-floor power estimate, the power delay profile, and a noise-scaling factor.

24 Claims, 2 Drawing Sheets

METHOD OF AND APPARATUS FOR COMPUTATION OF UNBIASED POWER DELAY PROFILE

CROSS-REFERENCE TO RELATED APPLICATIONS

This patent application incorporates by reference the entire disclosure of a U.S. patent application Ser. No. 10/755,803 entitled Method of and Apparatus for Path-searcher Window Positioning, Attorney Docket No. 53807-00075USPT and filed on the same date as this patent application.

BACKGROUND

1. Technical Field

The invention relates to digital wireless communications systems in which delays of individual multi-path components of a time-varying fading channel are to be estimated. The digital wireless communications systems may include, for example, systems using Code Division Multiple Access (CDMA) RAKE receivers. The invention relates in particular to improving robustness of detection of new multi-path components in a radio propagation channel, as well as of tracking known paths, by reliably indicating a proper position for a path searcher window.

2. History of Related Art

In wireless communications, a physical channel between a transmitter and a receiver is formed via a radio link. In most cases, no antenna of the transmitter is narrowly focused towards the receiver. In addition to a possible direct path, many other propagation paths often exist between the transmitter and the receiver. The other propagation paths typically result from reflections from objects near the transmitter or the receiver. Rays with similar propagation distances combine at the receiver, depending on an instantaneous phase relationship, and form a distinct multi-path component. The effect of a combination of the rays depends on the instantaneous phase relationship of a carrier wavelength and also on distance differences among the rays. In the case of destructive interference, the combination of the rays leads to a significant decrease in path-gain magnitude (i.e., fading).

Performance of a CDMA receiver is improved if signal energy carried by many multi-path components is utilized. A desired improvement in CDMA receiver performance may be achieved via a RAKE receiver. In the RAKE receiver, each of a plurality of multi-path components is assigned a despreader (i.e., RAKE finger). Each of the plurality of despreaders is assigned a reference copy of a spreading code. Each of the spreading-code reference copies is delayed in time by an amount equal to a path delay of a corresponding multi-path component. Outputs of the respective despreaders are then coherently combined via a RAKE combiner to produce a symbol estimate.

The RAKE receiver preferably uses knowledge of the multi-path delays and channel-impulse values for all detected paths. To achieve a best possible signal-to-noise ratio at an output of the RAKE combiner, signal energy from as many physical paths as possible should be collected. In addition, tracking as many different physical paths as possible (i.e., maximal utilized diversity) significantly improves signal-reception robustness, since the probability of a simultaneous deep fade of all paths is reduced. Simultaneous deep fade of all paths is a phenomenon that typically leads to serious block-error-rate (BLER) degradation.

A propagation channel structure (i.e., absolute and relative delays of the individual multi-path components) does not typically remain constant over time. Due to relative movement of the transmitter, the receiver, and nearby objects, delays of existing paths may change, old paths may disappear, and new paths may appear. In addition, a frequency offset between respective circuits of the transmitter and the receiver gives rise to a clock drift. The clock drift generally manifests itself as a gradual time-axis movement of the entire delay profile. To ensure proper operation of the RAKE receiver, the changing delays of all known multi-path components should be tracked and new paths should be discovered quickly after the new paths appear.

Due to the physical channel structure, in most cases relative positions of the nearby objects change. Thus, path lengths of the new paths usually do not differ significantly from path lengths of the existing paths. The macro-structure of the channel (e.g., mountains or groups of buildings that cause signal reflections) changes relatively rarely. Therefore, most often, the delays of the new paths are relatively similar to those of the existing, known, paths. Therefore, the delays of the new paths may be detected by searching in a delay domain near the known delays of the existing paths.

FIG. 1 is a block diagram of a typical RAKE receiver. A RAKE receiver 100 includes a delay estimator block 102, a channel estimator block 104, and a RAKE despreader/combiner block 106. Received data are fed to the delay estimator block 102. The delay estimator block 102 evaluates an impulse response of a channel over a range of possible delays of the channel. A resulting delay profile, which may be a complex delay profile or a power delay profile, may then be subjected to peak detection and detected peak locations reported to the RAKE despreader/combiner block 106 as delay estimates for the multi-path components. The delay estimates are also used by the channel estimator block 104 to estimate corresponding complex channel coefficients by despreading a pilot sequence and possibly filtering results over time to reduce the effects of noise and interference. Channel parameters are estimated in collaboration between the delay estimator block 102, which determines temporal alignment of a despreader portion of the RAKE despreader/combiner block 106, and the channel estimator block 104, which estimates the complex coefficients to be used by a combiner portion of the RAKE despreader/combiner block 106. A noise-plus-interference power estimate is also made.

A simple approach to delay estimation involves evaluating an impulse response of a channel over an entire range of possible delays (i.e., maximal assumed delay spread) of the channel. A resulting complex delay profile or power delay profile may then be subjected to peak detection and detected peak locations reported by the delay estimator block 102 to the channel estimator block 104 and the RAKE despreader/combiner block 106 as delay estimates. However, processing and power-consumption expenses of frequent execution of a full path-searching routine are usually prohibitive. Therefore, typical implementations use path searchers with observation windows shorter than the full search area (i.e., a maximal assumed delay spread). In addition, for any practical delay estimation, a path search is periodically undertaken to re-scan the delay range with the purpose of detecting new paths.

A delay-estimation algorithm employed by the delay estimator block 102 extracts the path positions and finds the power delays with sufficient accuracy once the path positions have been discovered by the path searcher. A path-searcher window is positioned so that new paths are included within the path-searcher window. Since it is known with sufficient probability that the new paths will appear in the vicinity, in terms of the paths' respective delays, of the currently-known paths, the path-searcher window is usually placed so as to cover the currently-known paths.

An estimate $g(\tau_i)$ of a current power delay profile for delays $\tau_i (i \in [1, M])$ typically includes a set of recently-detected or currently-tracked paths, in which case the delays $\tau_i$ are usually not contiguous. $g(\tau_i)$ may also represent a contiguous region ($\tau_i = \tau_0 + i\Delta\tau$) over which the path search is conducted. Other ways of representing the power delay profile are also possible.

A suitable start position I for a path searcher window of length $N_w$ needs to be determined. A typically-used method for determining a suitable path-searcher window start position for a next path-searcher activation is based on computing a center of gravity (i.e., mean excess delay) of the presently-known power-delay-profile estimate. A center-of-gravity position estimate C is computed as follows:

$$C = \frac{\sum_i \tau_i g(\tau_i)}{\sum_i g(\tau_i)} \quad (1)$$

Given C, the path-searcher window is placed so that most of the channel power is covered by the window. Because of space loss, a typical shape of the power delay profile exhibits exponential decay, such that the energy is concentrated towards the beginning of the region of interest. For reasonable coverage, the window can be placed, for example, ⅓ ahead of and ⅔ behind the value of C $$\left(i.e., I = C - \frac{N_w}{3}\right).$$

In the case of a compact true power delay profile and a high receiver signal-to-noise ratio, C gives a consistent and reliable estimate of the true energy concentration in the channel. However, when the energy in the channel is distributed over a wide delay spread and when the signal-to-noise ratio of the power delay profile is poor, C is not so reliable. The noise-induced component of $g(\tau_i)$ causes a bias term that shifts the result of C towards an average non-power-weighted delay of all entries of the power delay profile. The size of the bias term depends on how far from each other the true center of gravity and the average delay are separated and also depends on the signal-to-noise ratio. In many practical cases, the bias term is large enough to shift the path-searcher window away from significant portions of the true power delay profile.

To counteract noise-induced bias effects, $g(\tau_i)$ may be thresholded, which removes a portion of the noise-only samples and reduces bias. However, efficient noise removal assumes the use of a rather high threshold, which may also remove channel components from, and thus distort, the power delay profile.

The noise effect may also be reduced by noise subtraction, where average noise power $\sigma_g^2$ in the power delay profile is estimated. Instead of $g(\tau_i)$, $g(\tau_i) - \sigma_g^2$ is used in the center-of-gravity computation. In a typical implementation, the center-of-gravity computation is based on a coarse power-delay-profile estimate over a range of $N_w$ delay values. The positions of the $N_p$ largest peaks of that power delay profile are taken as the delay values $\tau_i$. The noise floor $\sigma_g^2$ is estimated by averaging the $N_n = N_w - N_p$ smallest power-delay-profile values. However, this approach severely underestimates $\sigma_g^2$. Since the noise floor is not removed completely, significant residual bias effect remains. To improve the robustness and precision of the center-of-gravity computation and of the resulting path-searcher window placement, an approach is needed that more adequately removes the noise floor from center-of-gravity computations.

SUMMARY OF THE INVENTION

Embodiments of the present invention provide a method of and apparatus for computation of an unbiased power delay profile. A method of determining a noise-corrected power delay profile includes determining a power delay profile and calculating a noise-corrected power delay profile. The step of calculating the noise-corrected power delay profile includes using a biased noise-floor power estimate, the power delay profile, and a noise-scaling factor.

An apparatus for determining a noise-corrected power delay profile includes a channel estimator, a despreader, and a delay estimator. The delay estimator is interoperably connected to the channel estimator and the despreader. The delay estimator is for determining a power delay profile and calculating a noise-corrected power delay profile. The step of calculating the noise-corrected power delay profile includes using a biased noise-floor power estimate, the power delay profile, and a noise-scaling factor.

An article of manufacture for determining a noise-corrected power delay profile includes at least one computer readable medium and processor instructions contained on the at least one computer readable medium. The processor instructions are configured to be readable from the at least one computer readable medium by at least one processor and thereby cause the at least one processor to operate as to determine a power delay profile and calculate a noise-corrected power delay profile. The calculation of the noise-corrected power delay profile includes using a biased noise-floor power estimate, the power delay profile, and a noise-scaling factor.

BRIEF DESCRIPTION OF THE DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF EXEMPLARY EMBODIMENTS OF THE INVENTION

Figure 1:
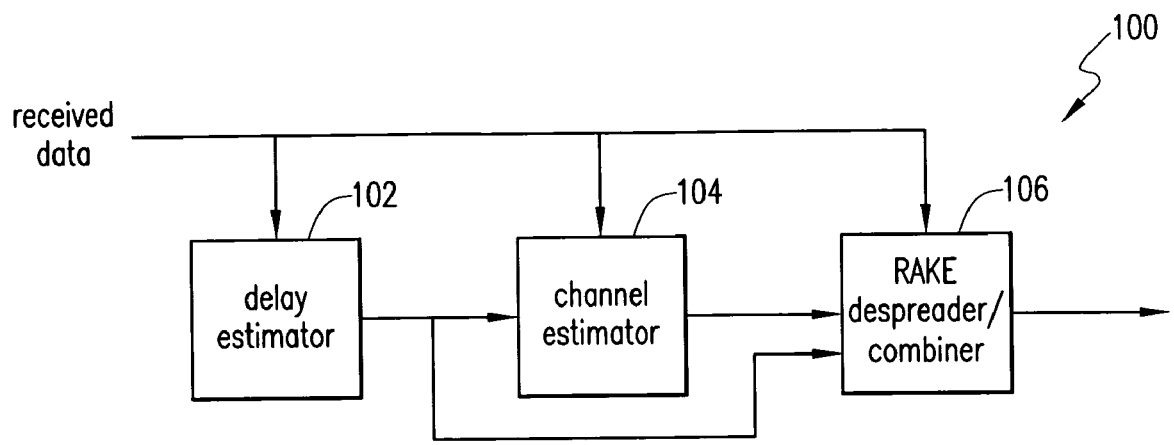
FIG. 1, previously described, is a block diagram of a typical RAKE receiver.
Figure 2:
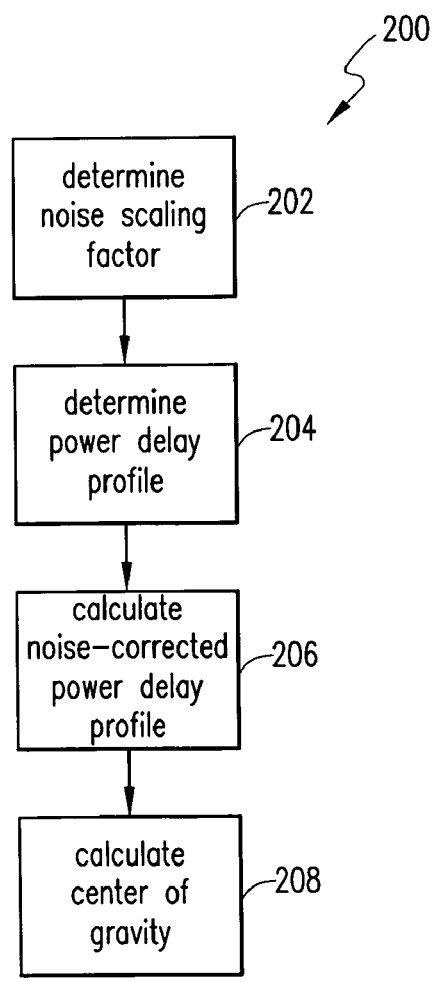
FIG. 2 is a flow diagram that illustrates calculation of a center-of-gravity position estimate in accordance with principles of the present invention.

Embodiments of the invention permit an unbiased center-of-gravity position estimate to be calculated given a set of $N_w$ power-delay-profile values. The center-of-gravity position estimate is computed from a subset of the power-delay-profile values. The subset may be, for example, the $N_p$ largest peaks. A noise floor component is removed from the $N_p$ peaks before the center-of-gravity position estimate is computed. A noise floor power is computed by averaging a subset of the power-delay-profile values. The subset of the power-delay-profile values may be, for example, the $N_n$ smallest values. A noise-scaling factor $\gamma$ is introduced into the center-of-gravity position estimate. The noise-scaling factor, which converts the biased noise floor power into an unbiased value, is computed based on a probability distribution of the noise component and on $N_w$, $N_p$, and $N_n$. As a result, the computed center-of-gravity position estimate is substantially unbiased and the path-searcher window is positioned with the best likelihood of covering all the paths included in the power delay profile. FIG. 2 is a flow diagram that illustrates calculation of a center-of-gravity position estimate C in accordance with principles of the present invention. A flow 200 begins at step 202, at which step a noise-scaling factor $\gamma$ is determined. The noise-scaling factor $\gamma$ may be determined offline and utilized online by the delay estimator block 102 in determining the center-of-gravity position estimate C. At step 204, a power delay profile $g_m$ is determined. At step 206, a noise-corrected power delay profile is calculated using a biased noise-floor power estimate $\sigma_g^2$, the noise-scaling factor $\gamma$, and the power delay profile $g_m$. At step 208, the center-of-gravity position estimate C is calculated using the noise-corrected power delay profile.

A path searcher processes a window of length $N_w$(e.g., chips) and, at each nth activation, the power delay profile $g_m$ is estimated, with $m \in [m_0, m_0+N_w-1]$. Out of the power delay profile, $N_p$ peaks (specifically delays $\tau_k$ and powers $h_k$ for k=1 ... $N_p$) are detected and reported. Let $h_k=p_k+n_k$, where $p_k$ is the actual path power after power-delay-profile accumulation and $n_k$ is a residual noise plus an interference component. The power-delay-profile noise-floor power estimate $\sigma_g^2$ based on the $N_n$ lowest power-delay-profile samples is also available.

Traditionally, the center-of-gravity position estimate C is computed based on the reported delays and noise-corrected powers as indicated in equation (2) below.

$$\tau^{(n)} = \frac{\sum_{k=1}^{N_p} \tau_k(h_k - \sigma_g^2)}{\sum_{k=1}^{N_p} (h_k - \sigma_g^2)} \quad (2)$$

The noise floor power $Z=\sigma_g^2$ is estimated as the mean of the $N_n$ smallest power-delay-profile samples. However, the noise included in a selected peak set $\{h_k\}$, k=1 ... $N_p$, does not have the same distribution as the smallest $N_n$ samples. In the most troublesome cases, when there are many noise samples and few or no true paths, $\{h_k\}$ contains all the largest noise samples whose mean power (denoted by Z*) is significantly larger than the average power of the remaining noise floor. The $n_k$ are well-modeled as magnitude squares of complex Gaussian random variables. In other words, the $n_k$ have the $X_2^2$ – distribution with the probability density function $$f(x) = \frac{1}{\sqrt{2\pi x \sigma_g}} e^{\frac{x}{2\sigma_g^2}}.$$

We can thus express $$Z = \frac{\int_0^\alpha xf(x)dx}{N_n/N_w}$$

(corresponding to the near-zero portion of the probability density function) and $$Z^* = \frac{\int_\beta^\infty xf(x)dx}{N_p/N_w}$$

(corresponding to the tail of the probability density function), where the integration limits $\alpha$ and $\beta$ are defined so that $$\int_\beta^\infty f(x)dx = \frac{N_p}{N_w} \text{ and } \int_0^\alpha f(x)dx = \frac{N_n}{N_w}.$$

The noise-scaling factor $\gamma$ is then determined as the following ratio:

$$\gamma = \frac{Z^*}{Z} \quad (3)$$

Figure 3:
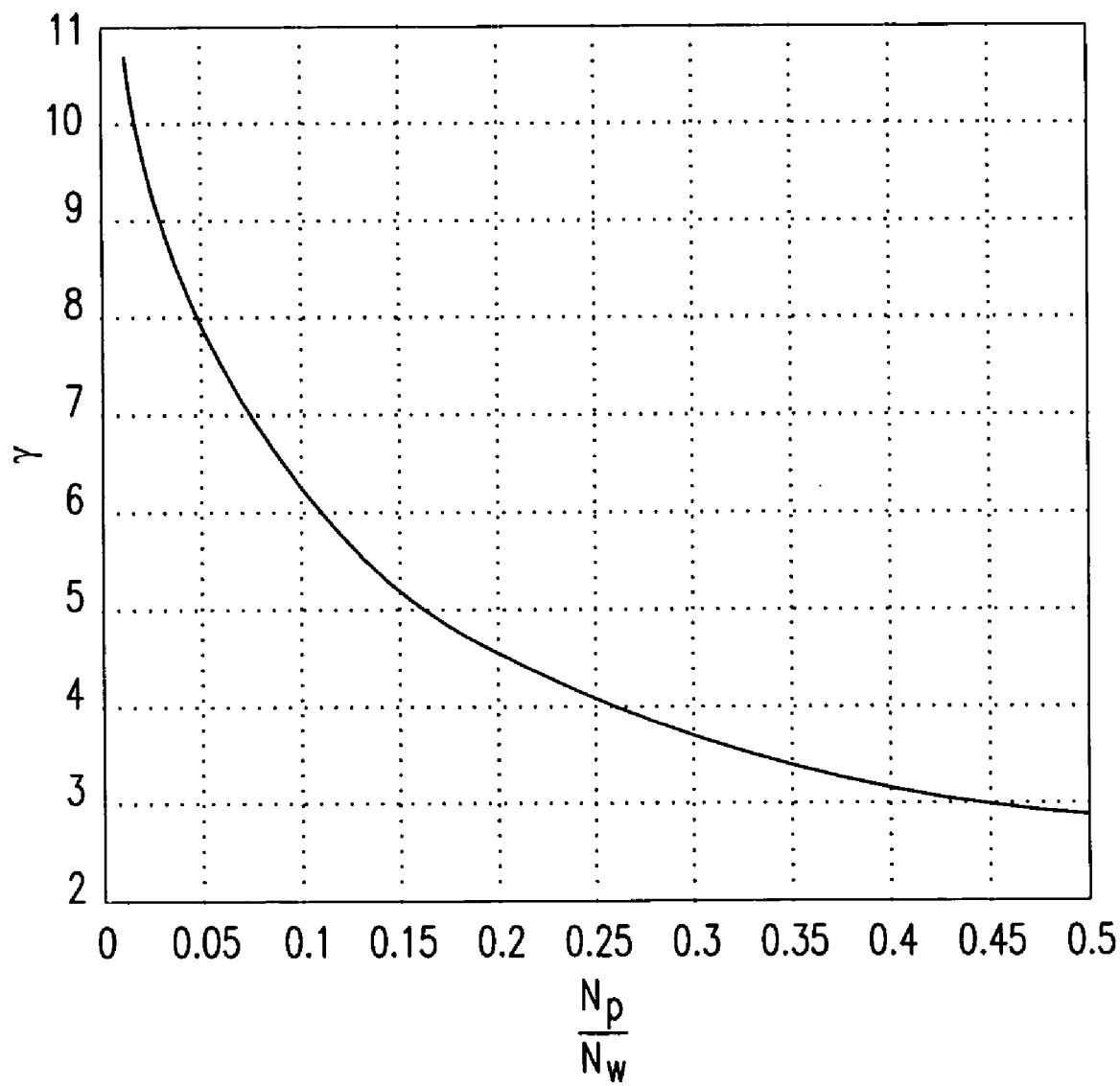
FIG. 3 is a graph that illustrates exemplary values of a noise-scaling factor in accordance with principles of the invention.

FIG. 3 is a graph that illustrates exemplary values of $\gamma$ as a function of $$\frac{N_p}{N_w},$$

assuming a typical value of $$\frac{N_n}{N_w}$$

of 0.8. It is apparent from FIG. 3 that, in the example shown therein, using Z directly for noise correction underestimates the relevant noise power Z* by a factor of approximately 4-8. In other words, only approximately 12-25% of the noise power is removed.

It may be shown that the expected bias of the center-of-gravity value equals $$E[C_{true} - C] = \left(C_{true} - \frac{N_w}{2}\right)\frac{N_w E[n_k - \gamma Z]}{\sum_{k=1}^{N_p} p_k}$$

where $C_{true}$ is the actual center of gravity. Noise removal may be achieved by minimizing $E[n_k-\gamma Z]$. Bias would in fact be removed if the true $\gamma Z=En_k$ could be used, Equation (3) representing a practical estimate of such a $\gamma$. As shown, the bias is removed by embodiments of the invention when a noise-scaling factor $\gamma$ is introduced into the center-of-gravity calculation as follows:

$$C = \frac{\sum_{k=1}^{N_p} \tau_k(h_k - \gamma Z)}{\sum_{k=1}^{N_p} (h_k - \gamma Z)} \quad (4)$$

The noise-scaling factor $\gamma$ may be determined in advance, thus avoiding on-line computations. The denominator of equation (4) directly yields the unbiased signal power estimate $P_i$, wherein $$P_i = \sum_{k=1}^{N_p} h_k - N_p \gamma Z \quad (5)$$

and equation (5) may be utilized in other parts of the path-searcher algorithm.

The value of $\gamma$ based on a fixed argument $$\frac{N_p}{N_w}$$

may differ from the optimal value when there are many actual paths and fewer noise-only entries within the observation window. The optimal noise-scaling factor is $$\gamma' = \frac{N_{paths} + \gamma(N_p - N_{paths})}{N_p} \quad (6)$$

where $N_{paths}$ is the number of true paths among the $N_p$ selected peaks. When the value of $\gamma$ differs from the optimal value due to many actual paths and fewer noise-only entries, an over-correction results in residual bias in the opposite direction to remain. However, the ratio $$\frac{N_w E[n_k - \gamma Z]}{\sum_{k=1}^{N_p} p_k},$$

and correspondingly any center-of-gravity bias, is kept small. In high-noise cases, practical tests indicate a good model match and removal of almost all of the bias.

Embodiments of the invention permit the actual noise floor of the observed power delay profile included in the center-of-gravity computation to be determined, based on a noise floor estimate derived from the partial noise distribution. As a result, the calculated center-of-gravity value is unbiased or has a significantly reduced bias, improving the robustness of the window placement. In addition, the instantaneous center-of-gravity value calculated in accordance with principles of the invention may be time averaged or combined with other center-of-gravity values from other time or space points without incurring any bias-related errors and without requiring heuristic selection steps.

Embodiments of the invention are computationally efficient, in that typically only one table lookup and one multiplication, in addition to the conventional center-of-gravity computation, are required. Given the relatively-infrequent computation of the path-searcher window position, the computational premium is usually negligible.

As will be appreciated by those having skill in the art, the invention may take many embodiments. For example, embodiments of the invention may be used when other combinations of the number of peaks and the number of noise samples are used (e.g., so that $N_p+N_n \neq N_w$). In such cases, computation of the noise-scaling factor will then be numerically different; however, implementation details will be obvious to a person skilled in the art. In addition, principles of the invention may be employed in any applications in which the center-of-gravity needs to be computed. A complex delay profile may be used instead of a power delay profile, in which case the power of each delay profile element is found by multiplying the complex coefficient by its complex conjugate. Either an averaged or an instantaneous power delay profile may be used.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

What is claimed is:

1. A method of determining a noise-corrected power delay profile, the method comprising:
   determining a power delay profile;
   calculating a noise-corrected power delay profile, wherein the step of calculating the noise-corrected power delay profile comprises using a biased noise-floor power estimate, the power delay profile, and a noise-scaling factor; and
   calculating a center-of-gravity position estimate, wherein the step of calculating the center-of-gravity position estimate comprises using the noise-corrected power delay profile.

2. The method of claim 1, wherein the noise-scaling factor is applied to the noise-floor power estimate.

3. The method of claim 1, wherein the noise-scaling factor is dependent upon a probability density function.

4. The method of claim 1, wherein:
   the step of determining the power delay profile comprises using a first plurality of values; and
   the step of calculating the noise-corrected power delay profile comprises using the first plurality of values and a second plurality of values.

5. The method of claim 4, wherein:
   the first plurality of values is a plurality of power-delay-profile values $N_p$; and the second plurality of values is the $N_n$ smallest power-delay-profile values.

6. The method of claim 5, wherein the noise-scaling factor is dependent upon a probability density function of the biased noise-floor power estimate.

7. The method of claim 1, wherein:
Z is the biased noise-floor power estimate;
$\tau_k$ is a time delay;
$\gamma$ is the noise-scaling factor;
$h_k$ is a plurality of power values;
$N_p$ is a plurality of the plurality of power values $h_k$; and
the center-of-gravity position estimate is $$\frac{\sum_{k=1}^{N_p} \tau_k(h_k - \gamma Z)}{\sum_{k=1}^{N_p} (h_k - \gamma Z)}.$$

8. The method of claim 1, wherein:
Z is the biased noise-floor power estimate;
$\gamma$ is the noise-scaling factor;
$h_k$ is a plurality of power values; and
the noise-corrected power delay profile is $h_k - \gamma Z$.

9. The method of claim 1, wherein:
$\sigma_g^2$ is the biased noise-floor power estimate;
$Z^*$ is a mean power of a plurality of power values $h_k$;
$\gamma$ is the noise-scaling factor; and $$\gamma = \frac{Z^*}{\sigma_g^2}.$$

10. The method of claim 1, wherein:
$\gamma'$ is the noise-scaling factor;

$$\gamma' = \frac{N_{paths} + \gamma(N_p - N_{paths})}{N_p};$$

$N_p$ is a plurality of power values;
$N_{paths}$ is a number of true paths among the $N_p$ power values
$\sigma_g^2$ is the biased noise-floor power estimate;
$Z^*$ is a mean power of a plurality of power values $N_n$; and $$\gamma = \frac{Z^*}{\sigma_g^2}.$$

11. The method of claim 1, further comprising:
determining the noise-scaling factor;
storing the noise-scaling factor for on-line use; and
wherein the step of determining the noise-scaling factor is performed offline and before the steps of determining the power delay profile, calculating the noise-corrected power delay profile, and calculating the center-of-gravity position estimate.

12. An apparatus for determining a noise-corrected power delay profile, the apparatus comprising:
a channel estimator;
a despreader; and a delay estimator interoperably connected to the channel estimator and the despreader, the delay estimator for:
determining a power delay profile;
calculating a noise-corrected power delay profile; and
wherein the step of calculating the noise-corrected power delay profile comprises using a biased noise-floor power estimate, the power delay profile, and a noise-scaling factor.

13. The apparatus of claim 12, wherein the delay estimator is further for:
calculating a center-of-gravity position estimate; and
wherein the step of calculating the center-of-gravity position estimate comprises using the noise-corrected power delay profile.

14. The apparatus of claim 12, wherein the noise-scaling factor is applied to the biased noise-floor power estimate.

15. The apparatus of claim 12, wherein the noise-scaling factor is dependent upon a probability density function.

16. The apparatus of claim 12, wherein:
the step of determining the power delay profile comprises using a first plurality of values; and
the step of calculating the noise-corrected power delay profile comprises using the first plurality of values and a second plurality of values.

17. The apparatus of claim 16, wherein:
the first plurality of values is a plurality of power-delay-profile values $N_p$; and
the second plurality of values is the $N_n$ smallest power-delay-profile values.

18. The apparatus of claim 17, wherein the noise-scaling factor is dependent upon a probability density function of the biased noise-floor power estimate.

19. The method of claim 13, wherein:
Z is the biased noise-floor power estimate;
$\tau_k$ is a time delay;
$\gamma$ is the noise-scaling factor;
$h_k$ is a plurality of power values;
$N_p$ is a plurality of the plurality of power values $h_k$; and
the center-of-gravity position estimate is $$\frac{\sum_{k=1}^{N_p} \tau_k(h_k - \gamma Z)}{\sum_{k=1}^{N_p} (h_k - \gamma Z)}.$$

20. The method of claim 12, wherein:
Z is the biased noise-floor power estimate;
$\gamma$ is the noise-scaling factor;
$h_k$ is a plurality of power values; and
the noise-corrected power delay profile is $h_k - \gamma Z$.

21. The method of claim 12, wherein:
$\sigma_g^2$ is the biased noise-floor power estimate;
$Z^*$ is a mean power of a plurality of power values $h_k$;
$\gamma$ is the noise-scaling factor; and $$\gamma = \frac{Z^*}{\sigma_g^2}.$$

22. The method of claim 12, wherein:
$\gamma'$ is the noise-scaling factor;

$$\gamma' = \frac{N_{paths} + \gamma(N_p - N_{paths})}{N_p};$$

$N_p$ is a plurality of power values;
$N_{paths}$ is a number of true paths among the $N_p$ power values
$\sigma_g^2$ is the biased noise-floor power estimate;
$Z^*$ is a mean power of a plurality of power values $N_n$; and $$\gamma = \frac{Z^*}{\sigma_g^2}.$$

23. The apparatus of claim 13, further comprising:
determining the noise-scaling factor;
storing the noise-scaling factor for on-line use; and
wherein the step of determining the noise-scaling factor is performed offline and before the steps of determining the power delay profile, calculating the noise-corrected power delay profile, and calculating the center-of-gravity position estimate.

24. An article of manufacture for determining a noise-corrected power delay profile, the article of manufacture comprising:
at least one computer readable medium; and
processor instructions contained on the at least one computer readable medium, the processor instructions configured to be readable from the at least one computer readable medium by at least one processor and thereby cause the at least one processor to operate as to:
determine a power delay profile;
calculate a noise-corrected cower delay profile; and
wherein the calculation of the noise-corrected power delay profile comprises using a biased noise-floor power estimate, the power delay profile, and a noise-scaling factor;
wherein the processor instructions are further configured to cause the at least one processor to operate as to:
calculate a center-of-gravity position estimate; and
wherein the calculation of the center-of-gravity position estimate comprises
using the noise-corrected power delay profile.

* * * * *

UNITED STATES PATENT AND TRADEMARK OFFICE
CERTIFICATE OF CORRECTION

PATENT NO.        : 7,362,792 B2                                    Page 1 of 1
APPLICATION NO.   : 10/755760
DATED             : April 22, 2008
INVENTOR(S)       : Reial It is certified that error appears in the above-identified patent and that said Letters Patent is hereby corrected as shown below:

On the Title Page, item (56), under "OTHER PUBLICATIONS", in Column 2, Line 9, delete "Joseph" and insert -- Josep --, therefor.

In Column 10, Line 34, in Claim 19, delete "The method" and insert -- The apparatus --, therefor.

In Column 10, Line 50, in Claim 20, delete "The method" and insert -- The apparatus --, therefor.

In Column 10, Line 56, in Claim 21, delete "The method" and insert -- The apparatus --, therefor.

In Column 10, Line 66, in Claim 22, delete "The method" and insert -- The apparatus --, therefor.

Signed and Sealed this

Third Day of March, 2009

JOHN DOLL
*Acting Director of the United States Patent and Trademark Office*